United States Patent
Laridant et al.

(10) Patent No.: US 10,711,355 B2
(45) Date of Patent: Jul. 14, 2020

(54) ELECTROLYZER SPACER AND ELECTROLYZER EQUIPPED WITH SUCH A SPACER

(71) Applicant: AREVA H2GEN, Paris (FR)

(72) Inventors: Francois Laridant, Bourg la Reine (FR); Eric Gernot, Montlhery (FR); Fabien Aupretre, Chilly Mazarin (FR)

(73) Assignee: AREVA H2GEN, Paris (FR)

( * ) Notice: Subject to any disclaimer, the term of this patent is extended or adjusted under 35 U.S.C. 154(b) by 8 days.

(21) Appl. No.: 15/896,753

(22) Filed: Feb. 14, 2018

(65) Prior Publication Data
US 2018/0230609 A1 Aug. 16, 2018

(30) Foreign Application Priority Data
Feb. 14, 2017 (FR) ...................................... 17 51195

(51) Int. Cl.
*C25B 9/20* (2006.01)
*C25B 13/02* (2006.01)
*C25B 13/04* (2006.01)
*F16J 15/08* (2006.01)
*F16J 15/12* (2006.01)

(52) U.S. Cl.
CPC .............. *C25B 9/206* (2013.01); *C25B 13/02* (2013.01); *C25B 13/04* (2013.01); *F16J 15/0818* (2013.01); *F16J 15/122* (2013.01); *F16J 15/125* (2013.01); *F16J 15/127* (2013.01); *F16J 2015/085* (2013.01); *F16J 2015/0856* (2013.01); *Y02E 60/366* (2013.01)

(58) Field of Classification Search
CPC ......... C25B 9/206; C25B 13/02; C25B 13/04; F16J 15/0818; F16J 15/122; F16J 15/125; F16J 15/127; F16J 2015/085; F16J 2015/0856; Y02E 60/366
See application file for complete search history.

(56) References Cited

U.S. PATENT DOCUMENTS

| | | | | |
|---|---|---|---|---|
| 5,482,792 A | * | 1/1996 | Faita | .......................... C25B 9/10 429/437 |
| 6,235,168 B1 | * | 5/2001 | Strutt | ....................... C25B 9/066 204/253 |
| 2016/0153560 A1 | * | 6/2016 | Doucet | ...................... C25B 9/00 204/267 |

FOREIGN PATENT DOCUMENTS

DE  11 2014 005 208 T5  8/2016
EP      0 629 015 A1  12/1994
(Continued)

OTHER PUBLICATIONS

French Search Report dated Oct. 24, 2017 from corresponding French Application No. 1751195, 2 pages.

*Primary Examiner* — Ciel P Contreras
(74) *Attorney, Agent, or Firm* — Ohlandt, Greeley, Ruggiero & Perle, L.L.P.

(57) ABSTRACT

A spacer for an electrolyzer cell of substantially annular shape comprises:

a peripheral part having two parallel principal faces opposite each other, the distance separating the two principal faces defining a thickness of the spacer, and an internal part having a thickness strictly less than the thickness of the spacer, the peripheral part and the internal part being in one piece and connected to each other forming an internal annular shoulder so that the internal part has a substantially annular intermediate face extending in a plane parallel to the two principal faces of the peripheral part and situated between the two principal faces.

11 Claims, 5 Drawing Sheets

(56) References Cited

FOREIGN PATENT DOCUMENTS

WO  2005/028710 A1  3/2005
WO  2015/004378 A2  1/2015

\* cited by examiner

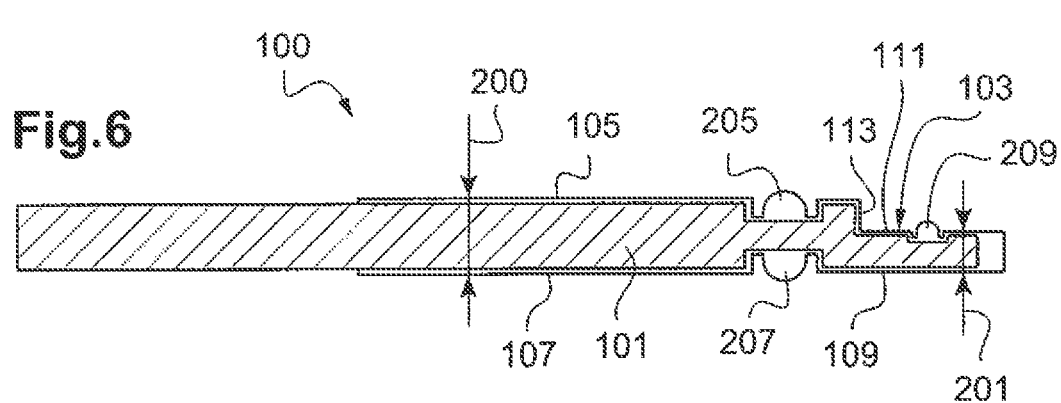
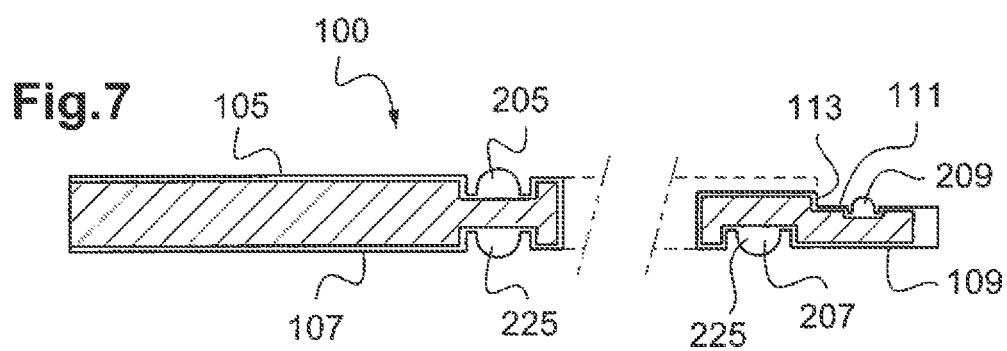
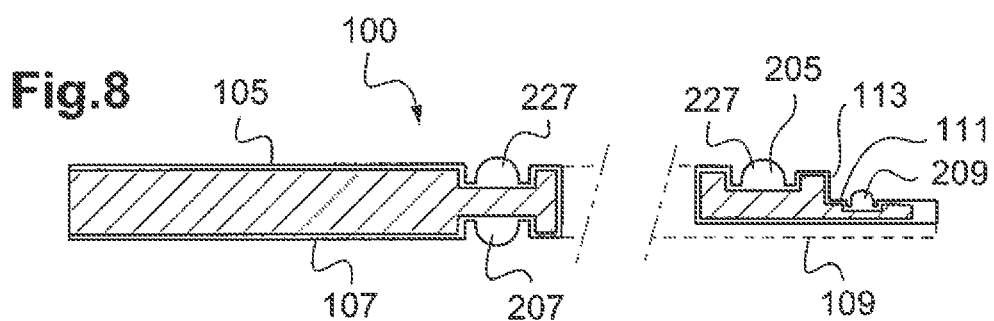
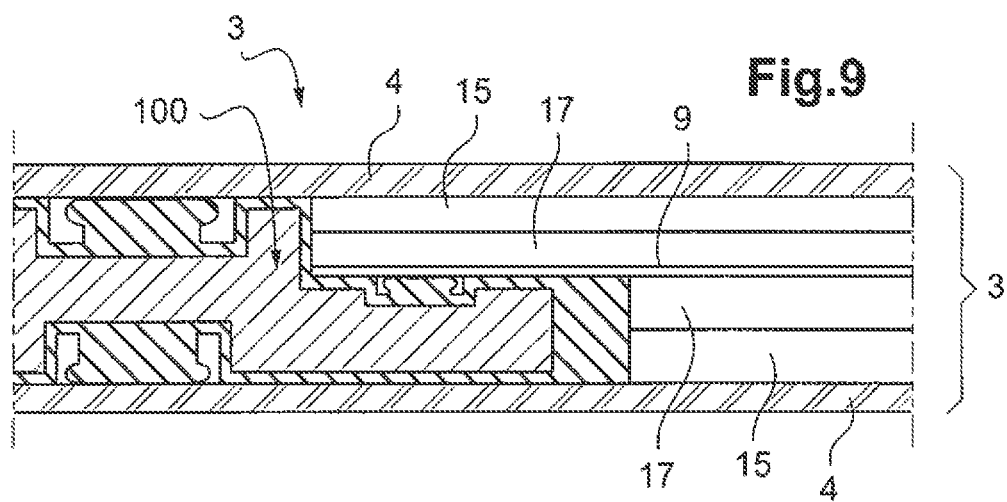

ELECTROLYZER SPACER AND ELECTROLYZER EQUIPPED WITH SUCH A SPACER

CROSS REFERENCE TO RELATED APPLICATIONS

This application claims benefit under 35 U.S.C. § 119(a) of French Patent Application No. 1751195, filed Feb. 14, 2017, the entire contents of which are incorporated herein by reference.

BACKGROUND OF THE DISCLOSURE

1. Field of the Disclosure

The invention concerns an electrolysis cell and a spacer for such a cell.

To produce hydrogen industrially in a decentralized and ecological manner, electrolysis of water is preferred to reforming. Current electrolyzer devices comprise a plurality of electrochemical cells, fed with water, and each comprising a pair of electrodes. For reasons of cost and overall size in particular, the cells are generally flat and grouped into one or more stacks, so that two superposed cells have each time a common electrode.

To reduce costs, linked notably to the fabrication and to the operation of the stacks, a general aim is to maximize the number of cells per stack. By applying a direct current between the anode and the cathode of each cell, by means of a generator the output voltage of which can be adjustable, the reaction of electrolysis of the water is brought about. Dihydrogen ($H_2$) and dioxygen ($O_2$) are thus produced.

2. Description of the Related Art

The Applicant has proposed seals that enable stacking of a large number of cells, for example up to 300 cells. The cells are capable of withstanding high clamping forces at internal pressures of approximately 45 bar. Such seals prove satisfactory and are described for example in WO 2015/004378.

If such seals are used at even higher pressures and/or with large pressure differences between two compartments of the same cell, deformations can appear. Moreover, the seals described in WO 2015/004378, mounted in pairs for each cell, necessitate laborious assembly of the cell if it is not to malfunction.

The invention aims to improve on this situation.

SUMMARY OF THE DISCLOSURE

The Applicant proposes a spacer for an electrolyzer cell of substantially annular shape and comprising:
a peripheral part having two parallel principal faces opposite each other, the distance separating the two principal faces defining a thickness of the spacer, and an internal part having a thickness strictly less than the thickness of the spacer, the peripheral part and the internal part being in one piece and connected to each other forming an internal annular shoulder so that the internal part has a substantially annular intermediate face extending in a plane parallel to the two principal faces of the peripheral part and situated between the two principal faces.

The spacer can moreover have the following features, optionally combined with one another:

the internal part further includes a substantially plane annular bearing face coplanar with one of the two principal faces of the peripheral part, the spacer comprises a metal core and an electrically insulative envelope covering the core at least over the areas of the spacer in contact with an internal space of the electrolyzer cell in the assembled state, at least one groove is formed in the core, extending substantially along the circumference of the spacer, and in at least one of the two principal faces and the intermediate face, the at least one groove forming a housing for a sealing line in the assembled state of the spacer, the envelope includes at least one rib extending substantially along the circumference of the spacer, and, in the rest state of the spacer, protruding from at least one of the two principal faces and the intermediate face, the at least one rib forming a sealing line in the assembled state of the spacer.

According to a second aspect of the invention, the Applicant proposes an electrolysis cell comprising two substantially plane electrodes parallel to each other, a membrane and a substantially annular internal part forming a spacer between the two electrodes in a stacking direction, the two electrodes and the spacer together delimiting an internal space of the cell.

The spacer comprises a peripheral part having two principal faces oppose each other and respectively bearing against the one and the other of the two electrodes, the distance separating the two principal faces defining a thickness of the peripheral part corresponding to the thickness of the internal space of the cell in the stacking direction, and an internal part having a thickness strictly less than the thickness of the peripheral part, the peripheral part and the internal part being in one piece and connected to each other forming an internal annular shoulder so that the internal part has a substantially annular intermediate face facing and at a distance from one of the two electrodes, the intermediate face supporting the membrane so that the membrane divides the internal space of the cell into two compartments.

DESCRIPTION OF THE DRAWINGS

Other features, details and advantages of the invention will appear on reading the following detailed specification and from the appended drawings, in which:

FIG. 6 is a diagrammatic view of the section VI represented in FIGS. 4 and 5, FIG. 7 is a diagrammatic view of the section VII represented in FIGS. 4 and 5, FIG. 8 is a diagrammatic view of the section VIII represented in FIGS. 4 and 5, and FIG. 9 is a diagrammatic and partial view of the section from FIG. 6 in the assembled state in a cell.

DETAILED DESCRIPTION OF THE DISCLOSURE

Hereinafter the terms "anode", "cathode" and their derivatives are used according to what is shown in the figures. Nevertheless, the proposed electrolyzer structures can operate in the opposite manner to that shown. For example, by reversing the polarisation and exchanging the assignments of the fluid inlets and outlets, the anode compartment can become the cathode compartment and vice versa. Unless otherwise indicated, the examples of dimensions given hereinafter are nominal values in the rest state of the parts.

Figure 1:
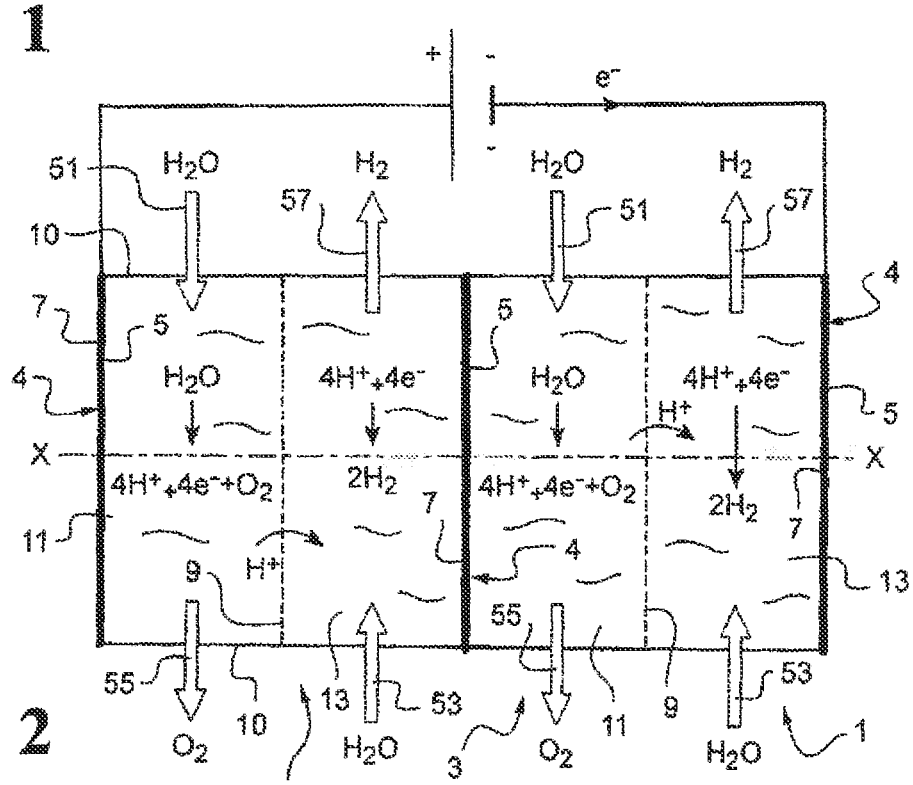
FIG. 1 is a diagrammatic representation of water electrolysis cells in a stack.

Reference is made to FIG. 1, which shows the electrochemical aspect of an electrolyzer stack.

An electrolyzer stack 1 comprises a plurality of water electrolysis cells 3 stacked the one on the other in a stacking direction XX. Only two cells 3 are shown in FIG. 1.

Each cell 3 comprises a pair of electrodes 5, 7, a proton exchange membrane (PEM) 9, and an external wall 10.

The two electrodes 5, 7 are each formed of a bipolar plate 4. A bipolar plate 4 comprises two faces opposite each other. A first face forms an anode 5 of a first cell 3, while a second face forms a cathode 7 of a second cell 3 adjacent the first cell 3. With the exception of the ends of the stack 1, each bipolar plate 4 is disposed at the interface of two adjacent cells 3.

The two bipolar plates 4 ligne electrodes 5, 7 of a cell 3 are of substantially plane shape. The electrodes 5, 7 are installed in a manner substantially parallel to each other and perpendicular to the stacking direction XX. Here the two electrodes 5, 7 are of identical structure and composition. Alternatively, the bipolar plates 4 can be adapted according to their function. For example, coatings can be provided to protect the electrodes 5, 7 chemically from the contents of the anode and cathode compartments.

The PEM membrane 9 is disposed between the two electrodes 5, 7 and substantially parallel to the electrodes 5, 7.

The space between the anode 5 and the PEM membrane 9 defines an anode compartment 11. The space between the cathode 7 and the PEM membrane 9 defines a cathode compartment 13. The anode compartment 11 and the cathode compartment 13 each contain water. De-ionized water is preferably used. For example, the water has a conductivity less than 1 μS·cm$^{-2}$.

The external wall 10 extends substantially in the stacking direction XX and delimits the anode compartment 11 and the cathode compartment 13. A first water inlet 51 is formed through the external wall 10 so as to open into the anode compartment 11. A second water inlet 53 is formed through the external wall 10 so as to open into the cathode compartment 13. An outlet 55 from the anode compartment 11 is formed through the external wall 10. The outlet 55 of the anode compartment 11 takes the form of a passage adapted to evacuate water charged with dioxygen ($O_2$) in gaseous form. An outlet 57 of the cathode compartment 13 is formed through the external wall 10. The outlet 57 of the cathode compartment 13 take the form of a passage adapted to evacuate water charged with dihydrogen ($H_2$) in gaseous form.

The application of an electrical voltage between the anode 5 and the cathode 7 drives the electrolysis reaction. The following reaction (1) takes place in the anode compartment 11:

$$2H_2O \rightarrow 4H^+ + 4e^- + O_2 \quad (1)$$

The protons ($H^+$) from the reaction (1) in the anode compartment 11 migrate through the PEM membrane 9 into the cathode compartment 13. The following reaction (2) takes place in the cathode compartment 13:

$$4H^+ + 4e^- \rightarrow 2H_2 \quad (2)$$

The reactions (1) and (2) in the electrolysis stack 1 are controlled by adjusting the direct current or the voltage applied to the electrodes 5, 7.

The anode 5 and the cathode 7 at the respective ends of the electrolysis stack 1 are intended to be connected to a direct current generator. The electrical connections and the current source common to the cells 3 of the stack 1 are not shown.

The first water inlet 51, the second water inlet 53, the dioxygen ($O_2$) outlet 55 and the dihydrogen ($H_2$) outlet 57 of each cell 3 of the stack 1 can be fluidically connected to the homologous inlets/outlets of the other cells 3 of the stack 1. Thus, the first water inlets 51 of the stack 1 are fed by a common water source, the second water inlets 53 of the stack 1 are fed by a common water source, the dioxygen ($O_2$) outlets of the stack 1 are connected to a common collector and the dihydrogen ($H_2$) outlets of the stack 1 are connected to a common collector.

The second water inlets 53 improve heat regulation and limit drying out of the PEM membrane 9. Alternatively, the second water inlets 53 are omitted on the side of the cathode 7.

Figure 2:
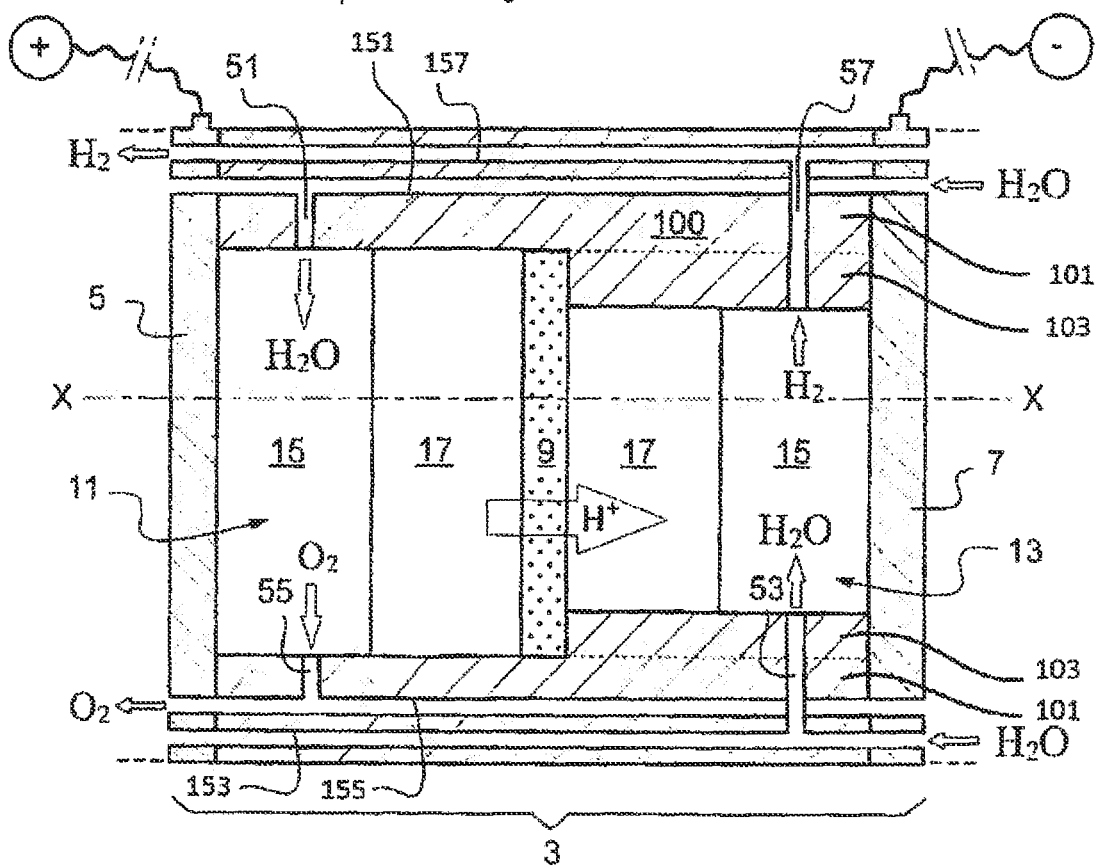
FIG. 2 is a diagrammatic representation of the operation of an electrolysis cell according to the invention.

Reference is made now to FIG. 2, which shows the mechanical and fluidic aspect of an electrolysis cell 3. The cell 3 comprises two bipolar plates 4, one forming an anode 5 while the other forms a cathode 7, a part 100 forming a spacer, the PEM membrane 9, two current diffusers 15, hereinafter termed diffusers 15, and two porous current collectors 17, hereinafter termed collectors 17.

The spacer 100 is retained between the anode 5 and the cathode 7 in the stacking direction XX. The anode 5, the cathode 7 and the spacer 100 together limit an internal space of the cell 3, inside the spacer 100. The PEM membrane 9 is disposed in the internal space of the cell 3 so as to delimit the anode compartment 11 and the cathode compartment 13. Each of the two compartments 11, 13 is occupied by a respective diffuser 15 and a respective collector 17. Each anode compartment 11 and each cathode compartment 13 house a diffuser 15 on the side of the anode 5, respectively the cathode 7, and a collector 17 on the side of the PEM membrane 9. The PEM membrane 9 is disposed, or sandwiched, between the two collectors 17.

For a cell 3 there are therefore found in the stacking direction XX in the internal space and in the following order:
the bipolar plate 4 forming an anode 5,
the diffuser 15 in the anode compartment 11,
the collector 17 in the anode compartment 11,
the PEM membrane 9,
the collector 17 in the cathode compartment 13,
the diffuser 15 in the cathode compartment 13, and
the bipolar plate 4 forming a cathode 7.

The spacer 100 is of substantially annular shape so as to separate the internal space from the outside of the cell 3. Here the spacer 100 forms the external wall 10 of the cell 3. The spacer 100 moreover forms an electrical insulator between the anode 5, the cathode 7 and the PEM membrane 9.

The anode compartment 11 and the cathode compartment 13, the respective two diffusers 15, and the respective two collectors 17, are similar two by two but have different dimensions. The two bipolar plates 4 are identical. Alternatively, the homologous parts on either side of the PEM membrane 9 have minor differences, apart from their dimensions.

In the assembled state of the cell 3 the face of the first bipolar plate 4 forming an anode 5 and the face of the second bipolar plate 4 forming a cathode 7 bear on respective opposite sides of the spacer 100 in the stacking direction XX. The spacer 100 maintains the separation between the two bipolar plates 4 in the stacking direction XX. Here the PEM membrane 9 bears against the spacer 100 on the cathode side and bears against the stack comprising the collector 17, the diffuser 15 and the anode 5 on the anode side. The stacking direction XX also corresponds to a clamping direction and a direction of the thickness of the bipolar plates 4, the spacer 100, the PEM membrane 9, the diffusers 15 and the collectors 17.

The dimensions of the PEM membrane 9, the diffusers 15 and the collectors 17 are adjusted so as substantially to fill the cell 3. Clamping the spacer 100 between the anode 5 and the cathode 7 seals the cell 3 and make the electrical contacts between the diffusers 15, the collectors 17 and the bipolar plates 4. The anode compartment 11 and the cathode compartment 13 are fluidically isolated from the outside of the cell 3.

The first water inlet 51, the second water inlet 53, the dioxygen ($O_2$) outlet 55 and the dihydrogen ($H_2$) outlet 57 of the cell 3 are respectively connected to a first water supply channel 151, a second water supply channel 153, a dioxygen ($O_2$) evacuation channel 155 and a dihydrogen ($H_2$) evacuation channel 157 common to the other cells 3 of the stack 1 not shown in FIG. 2.

Figure 3:
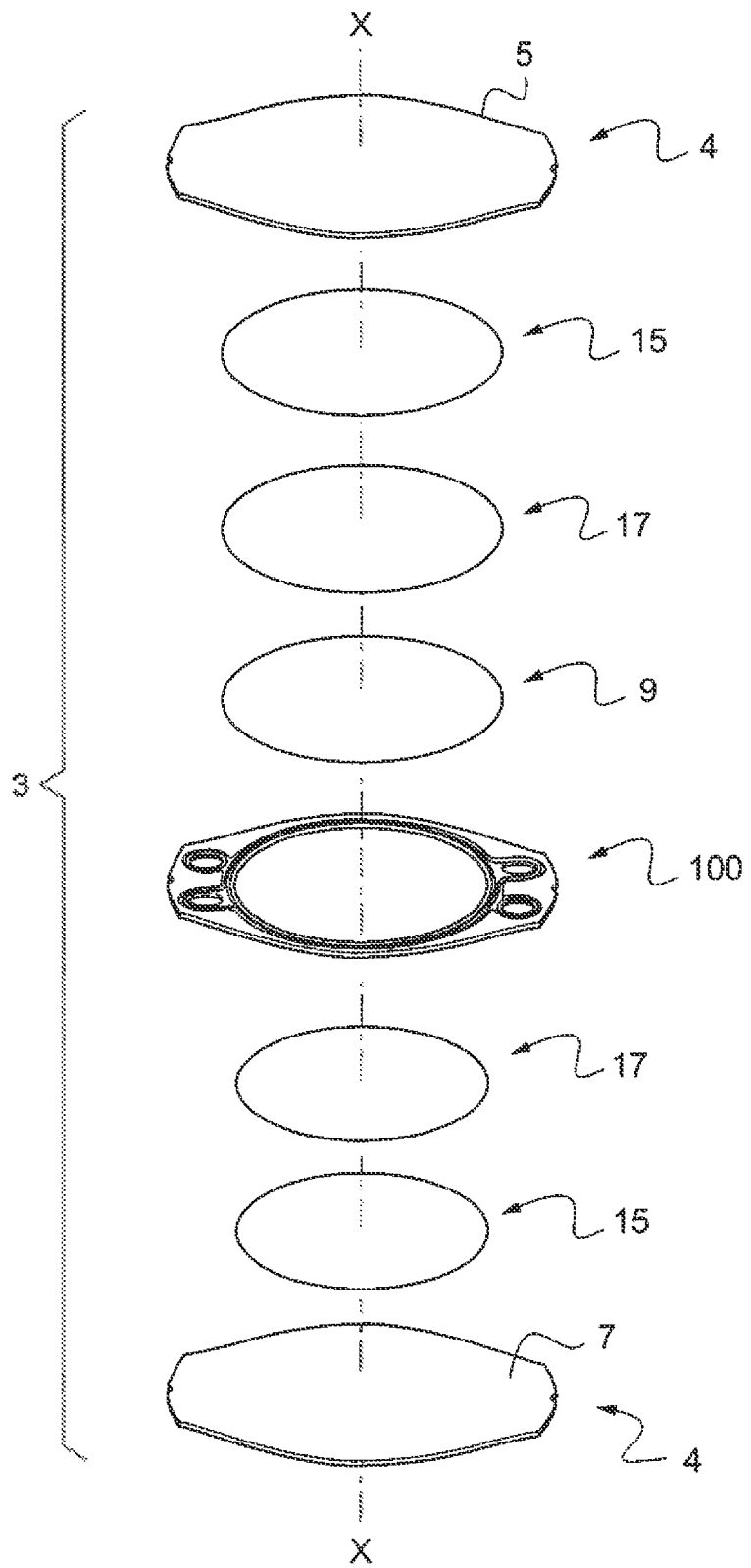
FIG. 3 is an exploded perspective view of an electrolysis cell according to the invention.

Reference is now made to FIG. 3. In the embodiment described here, the PEM membrane 9 is disk-shaped. Here its diameter is approximately 298 millimetres. Its thickness is between approximately 0.05 and 0.3 millimetre.

The bipolar plates 4 take the form of generally circular plane plates. The bipolar plates 4 each have an outside edge corresponding to the shape of the spacer 100. Alternatively, the outside edge of the anode 5 and/or the outside edge of the cathode 7 include a connector for a connection to the current source. The anode 5 and the cathode 7 are made from an electrically conductive material, for example titanium.

The diffusers 15 are electrically conductive. The diffusers 15 comprise passages for the fluids in one or more directions substantially perpendicular to the thickness direction, i.e. perpendicular to the stacking direction XX in the assembled state.

In the example described here, the diffusers 15 take the form of disc-shaped grilles. Alternatively, the diffusers 15 can take other shapes adapted to homogenize the circulation of the fluids in the anode compartment 11 and the cathode compartment 13. Here the diameter is approximately 280 millimetres in the anode compartment 11 while it is approximately 265 millimetres in the cathode compartment 13. The thickness is between approximately 0.9 millimetre and 1.2 millimetres. The diffusers 15 are made from an electrically conductive, for example titanium-based, material. Here the diffusers 15 take the form of grilles the mesh of which is adapted so that circulation of fluid in the direction of the principal plane of the diffuser 15 is as homogenous as possible in directions in the plane. For example, the meshes form a rhombus 4.5 by 2.7 millimetres.

Alternatively, the diffusers 15 can be produced by means of a set of channels formed in the anode 5 on the one hand and in the cathode 7 on the other hand.

According to a further alternative, the diffuser 15 on the side of the cathode 7 is omitted. This alternative is preferred when the second water inlets 53 are omitted and there is no circulation of water in the cathode compartment 13. In this case in particular, the dimensions can be modified. For example, the thicknesses on the cathode side can be reduced.

The collectors 17 are electrically conductive. The collectors 17 have fine pores so that exchanges of liquid and gaseous fluids through the collectors 17 are permitted in one or more directions substantially parallel to the direction of their thickness, i.e. parallel to the stacking direction XX in the assembled state.

In the example described here, the collectors 17 are disk-shaped. Here their diameter is approximately 280 millimetres in the anode compartment 11 while it is approximately 265 millimetres in the cathode compartment 13. The thickness is between 1.3 and 1.8 millimetres. Alternatively, notably in the absence of circulation of water in the cathode compartment 13, the thicknesses on the cathode side can be less. The collectors 17 are made from an electrically conductive material that is permeable to the liquids, for example porous sintered titanium.

The external dimensions and shapes of the diffusers 15 and the collectors 17 correspond to the inside dimensions and shapes of the spacer 100 inside which the diffusers 15 and the collectors 17 are housed. An assembly clearance is provided to allow expansion of the diffusers 15, the collectors 17 and the spacer 100 in operation. The diameter of the PEM membrane 9 is less than the inside diameter of the spacer 100 on the anode side and greater than the inside diameter of the spacer 100 on the cathode side. Thus the PEM membrane 9 comes to bear against the internal annular shoulder of the spacer 100 shown in FIG. 2 and described in more detail hereinafter. For their part the bipolar plates 4 have shapes and dimensions adapted to come to bear against the spacer 100.

In the example described here, the anode 5, the cathode 7, the two diffusers 15 and the two collectors 17 of the cell 3 are generally disk-shaped. The spacer 100 has a corresponding generally circular contour. The substantially axisymmetrical shapes facilitate resistance to pressure and homogenous distribution of the fluids in the cells 3. The circular shapes remain optional. Alternatively, the spacer 100 can have a substantially annular shape, i.e. a closed contour open at its centre, whilst having non-circular inside and outside edges as seen in the stacking direction XX, for example a rectangular, square or any other appropriate closed shape. Similarly, the anode 5, the cathode 7, the two diffusers 15 and the two collectors 17 of the cell 3 can have non-circular shapes corresponding to that of the spacer 100. Moreover, the dimensions given by way of example hereinabove can be modified as a function of the required application.

Alternatively, the PEM membrane 9 is replaced by an anionic membrane. In this case, the electrolyte is basic instead of acidic. The hydroxide anions ($HO^-$) pass through the anionic membrane. The chemical reactions in the compartments are modified but the structure and the operation of the stack 1 remain similar.

FIGS. 4 to 9 show an embodiment of a spacer 100, that can be used in cells 3 and a stack 1 as described heretofore.

Figure 4:
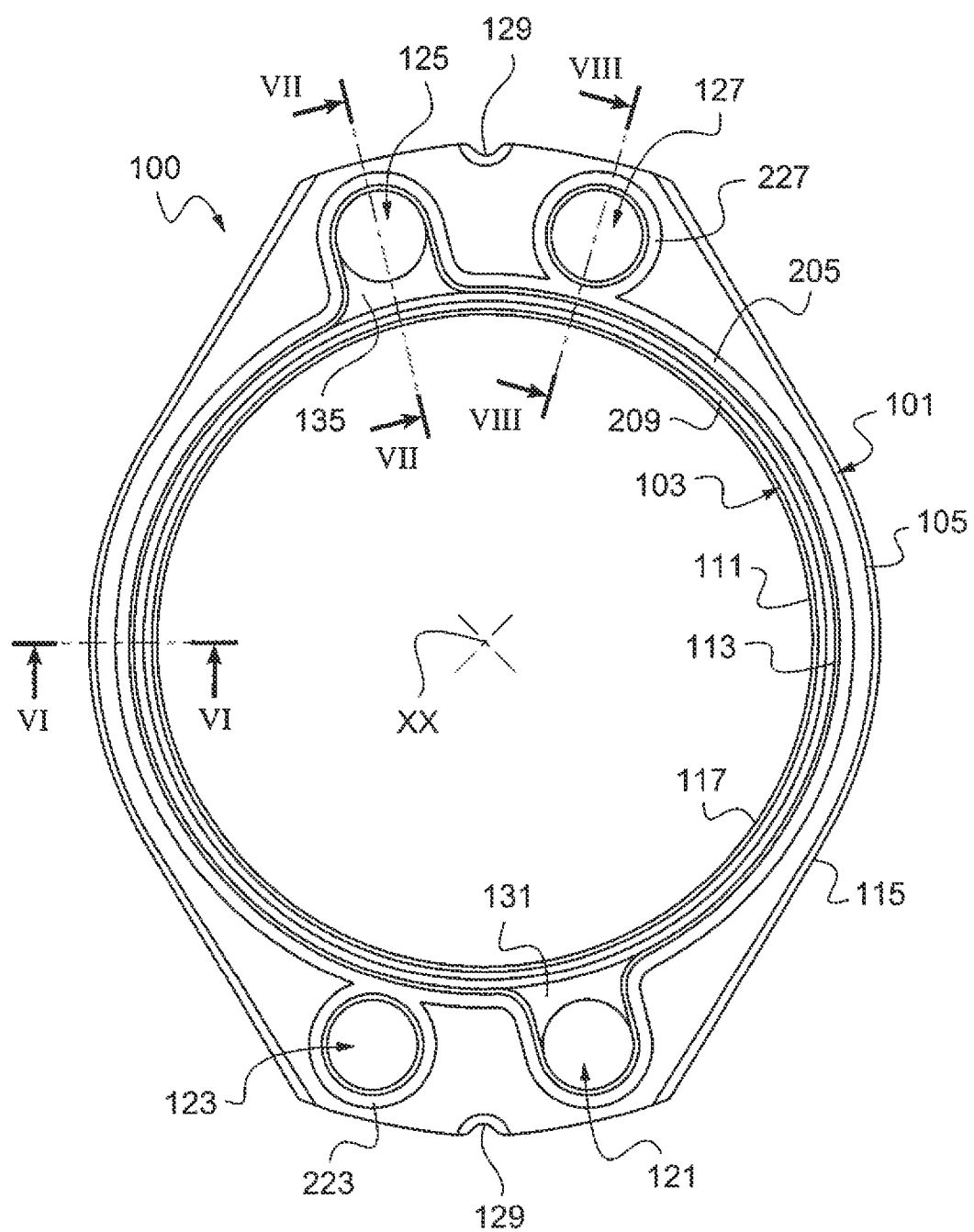
FIG. 4 is a view of one face of a spacer according to the invention.
Figure 5:
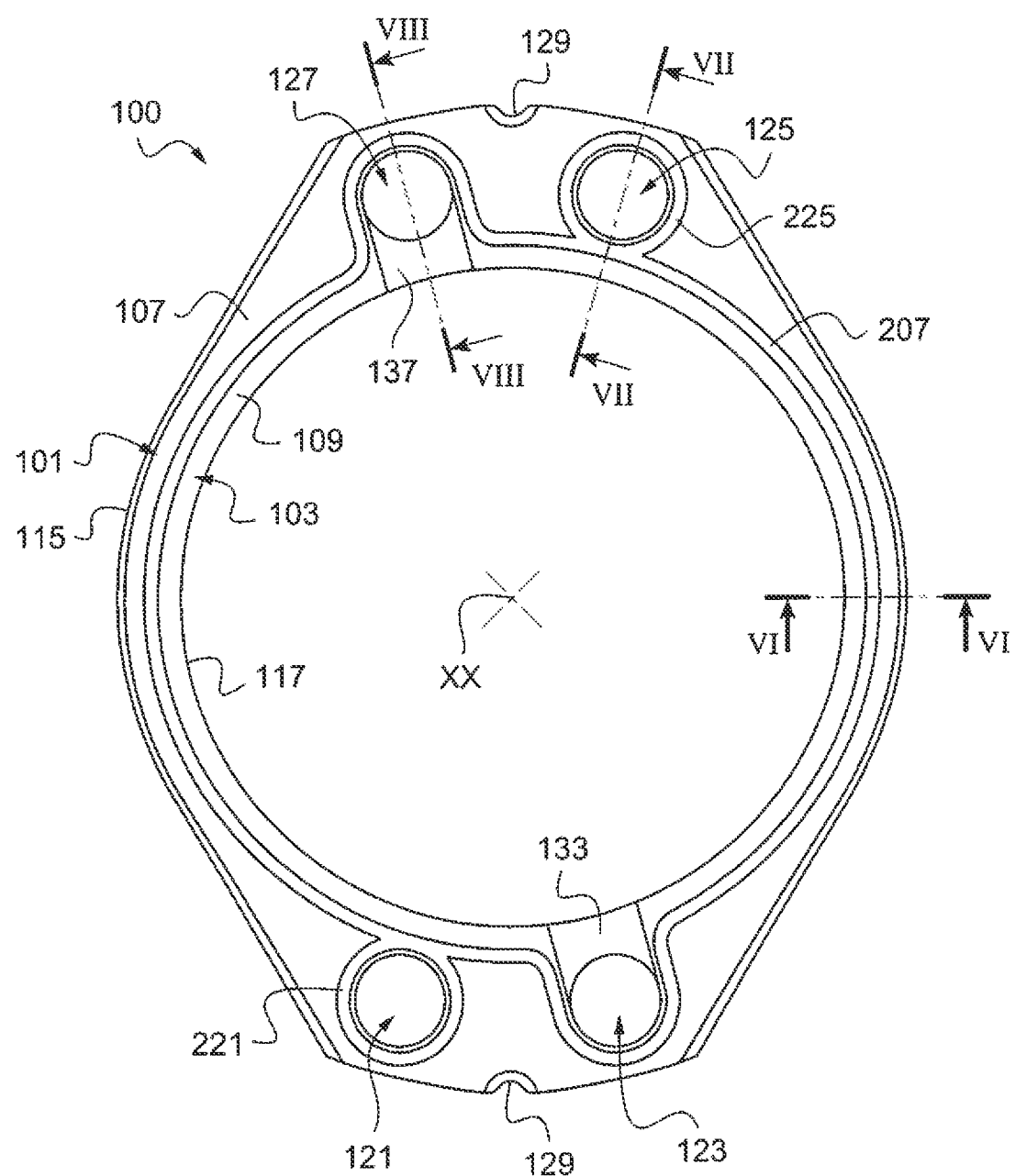
FIG. 5 is a view of the face opposite that seen in FIG. 4.

Reference is made to FIGS. 4 and 5. The spacer 100 is in one piece and of substantially annular shape. In an example described here, the spacer 100 has a substantially flat ring shape: it extends in a principal plane, corresponding to the plane of FIGS. 4 and 5, and has a direction of thickness perpendicular to the principal plane. In the stacked state, the direction of thickness of the spacer 100 is parallel to the stacking direction XX. The sections of the spacer 100 have a width substantially greater than their thickness around all of the circumference of the spacer 100.

The spacer 100 comprises a peripheral part 101 and an internal part 103. The internal part 103 protrudes from the peripheral part 101 toward the interior of the substantially annular shape.

The peripheral part 101 has a first principal face 105 and a second principal face 107 opposite each other and extending perpendicularly to the direction of thickness of the spacer 100. The internal part 103 having a bearing face 109. Here the bearing face 109 is substantially plane, annular and coplanar with the second principal face 107. The bearing face 109 of the internal part 103 is substantially in line with the second principal face 107 of the peripheral part 101. The internal part 103 has an intermediate face 111 opposite the bearing face 109. Here the intermediate face 111 is substantially plane, annular and set back relative to the first principal face 105 from the peripheral part 101 in the direction of thickness. The intermediate face 111 extends in a plane parallel to the first principal face 105 and to the second principal face 107 and between the two principal faces 105, 107 of the peripheral part 101. In the assembled state, the intermediate face 111 defines the position of the boundary between the anode compartment 11 and the cathode compartment 13 and receives the PEM membrane 9.

Thus the peripheral part 101 and the internal part 103 are formed in one piece and joined together to form an internal annular shoulder.

The peripheral part 101 has a thickness 200. The thickness 200 is defined by the distance separating the two principal faces 105, 107 of the peripheral part 101. The thickness 200 substantially corresponds to the overall thickness of the spacer 100. The internal part 103 has a thickness 201 defined by the distance separating the bearing face 109 and the intermediate face 111. The thickness 201 of the internal part 103 is strictly less than the thickness 200 of the peripheral part 101. The thickness 201 substantially corresponds to the thickness of the transfer compartment 13. The difference between the thickness 200 of the peripheral part 101 and the thickness 201 of the internal part 103 substantially corresponds to the thickness of the anode compartment 11, less the thickness of the PEM membrane 9.

The first principal face 105 of the peripheral part 101 and the intermediate face 111 of the internal part 103 are joined together by a joining surface 113. The joining surface 113 is annular and substantially cylindrical. The height of the joining surface 113 corresponds to the difference between the thickness 200 of the peripheral part 101 and the thickness 201 of the internal part 103. The connecting surface 113 forms an anode part of the external wall 10 of the cell 3 in the assembled state. In that state, the connecting surface 113 delimits the contour of the anode compartment 11 of the cell 3.

The spacer 100 furthermore has an external edge 115 and an internal edge 117. The external edge 115 connects the first principal face 105 and the second principal face 107 of the peripheral part 101 to each other. The external edge 115 forms the exterior contour of the annular shape of the spacer 100. The height of the external edge 115 corresponds to the thickness 200 of the peripheral part 101. The internal edge 117 connects the bearing face 109 and the intermediate face 111 of the internal part 103 to each other. The internal edge 117 extends along the interior contour of the annular shape of the spacer 100. The height of the internal edge 117 corresponds to the thickness 201 of the internal part 103. Here, the internal edge 117 has a diameter of approximately 265 millimetres. The internal edge 117 forms a cathode part of the external wall 10 of the cell 3 in the assembled state. In that state, the internal edge 117 delimits the contour of the cathode compartment 13 of the cell 3.

The spacer 100 includes a first orifice 121, a second orifice 123, a third orifice 125 and a fourth orifice 127. The four orifices 121, 123, 125, 127 pass through it in the direction of thickness. The first orifice 121 and the second orifice 123 are substantially diametrically opposite each other in the annular shape of the spacer 100. The third orifice 125 and the fourth orifice 127 are substantially diametrically opposite each other in the annular shape of the spacer 100. The four orifices 121, 123, 125, 127 each have a closed, here circular, contour. In operation, the four orifices 121, 123, 125, 127 allow the circulation of a fluid through the spacer 100 in the direction of thickness. In the assembled state of the spacer 100, the four orifices 121, 123, 125, 127 form respective portions of the first water supply channel 151, the second water supply channel 153, the dioxygen ($O_2$) evacuation channel 155 and the dihydrogen ($H_2$) evacuation channel 157 of the stack 1.

The spacer 100 comprises passages 131, 133, 135, 137 continuous with the orifices 121, 123, 125 and 127, respectively. The passage 131, 133, 135 and 137 extends between the orifice 121, 123, 125 and 127, respectively, and the internal space of the spacer 100, here substantially in a radial direction. In operation, the fluids pass between the channel 151, 153, 155 and 157 and the interior space of the cell 3 via the passage 131, 133, 135 and 137, respectively. Thus, in operation, the passages 131, 133, 135 and 137 respectively form the first water inlet 51 in the anode compartment 11, the second water inlet 53 in the cathode compartment 13, the dioxygen ($O_2$) outlet 55 from the anode compartment 11 and the dihydrogen ($H_2$) outlet 57 from the cathode compartment 13. Here, the passage 131, 133, 135 and 137 opens onto the diffuser 15.

Here, the passages 131, 133, 135, 137 take the form of grooves formed in one of the two principal faces 105, 107, produced for example by removal of material. The passages 131 and 135 are formed on the anode side, i.e. in the first principal face 105 in the example from FIGS. 4 and 5, while the passages 133 and 137 are formed on the cathode side, i.e. in the second principal face 107 in the example from FIGS. 4 and 5. Here, the edges of the passages 131 and 135 on the anode side are flared. This improves the homogeneity of the circulation of fluid in the anode compartment 11. The edges of the passages 133, 137 on the cathode side are straight. Alternatively, the anode side edges are straight and/or the cathode side edges are flared.

In the embodiment described here, the four orifices 121, 123, 125, 127 and their respective passage 131, 133, 135, 137 are grouped two by two in the circumference of the spacer 100. In an assembled state of the spacer 100 the channels 151, 153, 155, 157 for the fluids are therefore close together two by two, which reduces the overall size of the stack 1. By disposing the stack 1 so that the stacking direction XX is substantially horizontal, the inlets 51 and 53 can be disposed at the bottom while the outlets 55 and 57 can be disposed at the top. The evacuation of the gases via the outlets 55 and 57 is facilitated by the effect of the Archimedes thrust. This disposition remains optional: the orifices can be distributed differently in the spacer 100.

The spacer 100 has in its circumference:
  two main portions, free of orifices, on the left and on the right in FIGS. 4 and 5, and
  two communication portions, in which are formed the four orifices 121, 123, 125, 127, at the top and at the bottom in FIGS. 4 and 5.

The communication portions are enlarged relative to the main portions. In the communication portions, the external edge 115 takes the form of two circular arcs of approximately 400 millimetres diameter. In the main portions, the external edge 115 takes the form of two circular arcs of approximately 320 millimetres diameter. The communication and main portions are connected to one another in a substantially continuous manner. Moreover, the external edge 115 has a notch 129 in each of the two communication portions. Here, the notches 129 have a semi-circular shape and are arranged to cooperate with a guide of a stack 1. The notches 129 facilitate the indexing of the spacers 100 during the assembly of the stack 1 and improve their retention by an external structure. Alternatively, other guide and fixing means are provided.

In the example described here, the spacer 100 comprises a core 161 and an envelope 163 covering at least in part the core 161.

The core 161 is based on metal, for example stainless steel. Here, the envelope 163 has a composition based on ethylene-propylene-diene monomer (EPDM). The composition of the envelope 163 has an elasticity greater than that of the composition of the core 161. The EPDM used here makes it possible to obtain mechanical properties, and in particular resistance to extreme temperatures, improved relative to other elastomers. The use of EPDM rather than other elastomers remains optional. For example, fluoropolymers (FKM), silicones (VMQ), ethylenevinyl acetates (EVA and EVM) and chlorinated polyethylenes (CM) can be used as a function of the required applications. In the example described here, the envelope 163 is stuck to the core 161. The spacer 100 is obtained by injection moulding the material constituting the envelope 163 in contact with the core 161.

The envelope 163 is present at least on each of the surfaces of the core 161 that must be electrically insulated in operation. The electrically insulative envelope 163 covers the core 161 at least over the areas of the spacer 100 in contact with the internal space of the cell 3 in the assembled state. The chemical degradation of the core 161 by the fluids of the cell 3 is limited. In the example shown in FIGS. 4 to 8, the envelope 163 covers the core 161 in a continuous manner and over all the surfaces with the exception of the external edge 115 and areas of the first principal surface 105 and the second principal face 107 situated along the external edge 115 and the notches 129.

The non-coated surfaces of the core 161 enable the production of the spacer 100 to be facilitated, material to be saved and accurate guidance and alignment of the parts when assembling the stack 1.

The cell 3 further comprises seals adapted to prevent leaks of fluids between the parts forming the cell 3. In the example described here, the seals, or sealing lines, are formed of ribs, or local overthicknesses, formed in the envelope 163. Thus the one-piece spacer 100 provides a structural function by delimiting the compartments 11, 13 of the cell 3, an electrical insulation function and a sealing function. The addition of supplementary sealing parts is superfluous. Alternatively, at least some of the seals are formed by parts separate from the spacer 100. For example, deformable parts based on an elastomer of the ring or sausage type are disposed between substantially non-deformable parts. In other words, at least some of the ribs shown in the figures can be replaced by seals that are not in one piece with the spacer 100.

In FIGS. 4 and 5, the seals are represented by thick lines. In the example described here, the spacer 100 comprises:

- an anode sealing line 205 extending over the first principal face 105 and defining a continuous and closed contour around the connecting surface 113, the orifice 121 and the orifice 125;
- a cathode sealing line 207 extending over the second principal face 107 and defining a continuous and closed contour around the internal edge 117, the orifice 123 and the orifice 127;
- an intermediate sealing line 209 extending over the intermediate face 111 and defining a continuous and closed contour around the internal edge 117;
- orifice contour sealing lines 223 and 227 extending over the first principal face 105 and defining a continuous and closed contour around the orifice 123 and the orifice 127, respectively;
- orifice contour sealing lines 221 and 225 extending over the second principal face 107 and defining a continuous and closed contour around the orifice 121 and the orifice 125, respectively.

In the assembled state of the spacer 100, the anode sealing line 205 is disposed between the first principal face 105 and the anode 5 in the second direction XX to provide the seal between the anode compartment 11 and the outside. Fluidic communication is preserved substantially in a radial direction between the anode compartment 11 and the orifice 121, respectively the orifice 125, via the passage 131, respectively the passage 135. The cathode sealing line 207 is disposed between the second principal face 107 and the cathode 7 in the stacking direction XX to provide the seal between the cathode compartment 13 and the outside. Fluidic communication is preserved substantially in a radial direction between the cathode compartment 13 and the orifice 123, respectively the orifice 127, via the passage 133, respectively the passage 137. The intermediate sealing line 209 is disposed between the intermediate face 111 and the PEM membrane 9 in the stacking direction XX to provide the fluidic seal between the anode compartment 11 and the cathode compartment 13.

The orifice contour sealing lines 223 and 227 are disposed between the first principal face 105 and the anode 5 while the orifice contour sealing lines 221 and 225 are disposed between the second principal face 107 and the cathode 7. The orifice contour sealing line 221, respectively 223, 225 and 227, provides the seal between the outside and the channel 151, respectively 153, 155 and 157, formed by the alignment of the orifices 121, respectively 123, 125 and 127, of each of the cells 3 of a stack 1. As is apparent in the figures, the anode sealing line 205 locally coincides with the orifice contour sealing lines 223 and 227 while the cathode sealing line 207 locally coincides with the orifice contour sealing lines 221 and 225.

As is apparent in FIGS. 6 to 9, each rib conformed in the envelope 163 is housed in part in a corresponding groove formed in the core 161. Alternatively, the groove is omitted.

In the example described here, each of the ribs has a section of substantially symmetrical, here semi-circular, shape. Alternatively, other section shapes are employed. The grooves can, for example, have a rounded section. The ribs can have substantially square, rectangular, trapezoidal, or pointed or clipped, or even asymmetrical sections.

At rest, the ribs protrude from the first principal face 105, respectively the second principal face 107, of the bearing face 109 and the intermediate face 111. In the clamped state of the stack 1, as shown for example in FIG. 9, the ribs are compressed in the stacking direction XX and expand substantially in directions perpendicular to the stacking direction XX, here in the grooves formed in the core 161. By virtue of the elastic return effect, the ribs are pressed against the facing parts and therefore provide the seal. Alternatively, the presence of the grooves is combined with seals separate from the spacer 100. The grooves reduce the risk of the sealing lines deteriorating or being positioned incorrectly. In the example described here, in the in service state and therefore in the compressed state of the ribs, the height of a rib is reduced by 10% to 40% relative to the height of the same rib at rest. Moreover, the dimensions of the grooves are selected so that the portion of the volume of the grooves formed in the core 161 occupied by the material of the ribs is less than 90%.

In the example described here, the envelope 163 has a substantially constant thickness around the core 161 with the exception of the ribs that form local overthicknesses of the envelope 163. In the example described here, the thickness of the envelope 163 outside exception areas is greater than 0.3 millimetre. Apart from the ribs, the part of the envelope 163 covering the core 161 on the inside edge 117 also constitutes an exception to the homogeneity of the thickness. The part of the envelope 163 covering the inside edge 117 thus has a thickness greater than that of the envelope 163 in the other areas of the spacer 100. This thickness difference results from the operation of injection moulding the envelope 163. Alternatively, this overthickness is omitted.

In the state clamped in the stacking direction XX, the anode compartment 11 and the cathode compartment 13 can be subjected to different operating pressures. In the example described here, the anode compartment 11 operates at a static pressure substantially less than that of the cathode compartment 13. The pressure difference therefore contributes to uniform clamping of the PEM membrane 9 against the collector 17 disposed in the anode compartment 11. In other words, the PEM membrane 9 is held flat and substantially homogeneously against the anode collector 17 over all its surface. The seal is strengthened. The PEM membrane 9 is not or little loaded in tension. The risks of deformation of the PEM membrane 9 by tension and/or shear are reduced. The integrity of the PEM membrane 9 is preserved. At operating pressures equivalent to those of known stacks, a thinner PEM membrane 9 can be used, which improves the energy efficiency of the cell 3 and reduces the cost of the PEM membrane 9.

The PEM membrane 9 is clamped against the intermediate sealing line 209 by clamping the bipolar plate 4 forming an anode 5 toward the spacer 100 in the stacking direction XX and via the diffuser 15 and the collector 17 on the anode side.

In comparison to existing assemblies in which the PEM membrane 9 is pinched at its periphery between two similar parts, for example those described in document WO 2015/004378, in order to work the assemblies described here necessitate lower clamping thresholds. Such assemblies have greater tolerances on the thicknesses of the diffusers 15 and the collectors 17. For a usable area in the electrochemical exchanges of the PEM membrane 9 equivalent to that of known stacks, here the total surface area of the PEM membrane 9 is reduced.

Tests have been carried out on the seals shown in the figures. Stacks under test comprising at least 100 cells, even at least 150, 200 or even 300 cells resist pressures of approximately 100 bar in the anode compartment with approximately 60 bar in the cathode compartment and with a clamping force in the stacking direction XX of approximately 1000 to 3000 daN. Under test the pressure difference between the two compartments was therefore 40 bar. In service, there is a difference of 30 bar between the two compartments (75 bar and 45 bar in the one and the other of the compartments).

The invention is not limited to the examples of spacers, cells and stacks described above, by way of example only, but encompasses all variants that the person skilled in the art might envisage within the scope of the following claims. In particular, the examples of nominal dimensions could be modified as a function of the intended applications.

The invention claimed is:

1. A spacer for an electrolyzer cell of substantially annular shape comprising:
   a peripheral part having two parallel principal faces opposite each other, a distance separating the two principal faces defining a first thickness of the spacer; and
   an internal part having a second thickness strictly less than the first thickness of the spacer,
   the peripheral part and the internal part being in one piece and connected to each other forming an internal annular shoulder so that the internal part has a substantially annular intermediate face that extends in a plane parallel to the two principal faces of the peripheral part and is situated between the two principal faces;
   wherein the electrolyzer cell further comprises two electrodes; and
   wherein each of the two principal faces of the peripheral part are in direct contact with a respective electrode of the two electrodes.

2. The spacer according to claim 1, wherein the internal part further includes a substantially plane annular bearing face coplanar with one face of the two principal faces of the peripheral part.

3. The spacer according to claim 1, further comprising a metal core and an electrically insulative envelope covering the metal core at least over the areas of the spacer in contact with an internal space of the electrolyzer cell in an assembled state.

4. The spacer according to claim 3, further comprising at least one groove formed in the metal core, extending substantially along a circumference of the spacer, and in at least one of the two principal faces and the substantially annular intermediate face, the at least one groove forming a housing for a sealing line in the assembled state of the spacer.

5. The spacer according to claim 3, wherein the electrically insulative envelope includes at least one rib, extending substantially along a circumference of the spacer, and, in a rest state of the spacer, protruding from at least one of the two principal faces and the substantially annular intermediate face, the at least one rib forms a sealing line in the assembled state of the spacer.

6. The spacer according to claim 4, wherein the electrically insulative envelope includes at least one rib, extending substantially along the circumference of the spacer, and, in the rest state of the spacer, protruding from at least one of the two principal faces and the substantially annular intermediate face, the at least one rib forming a sealing line in the assembled state of the spacer.

7. An electrolysis cell comprising two substantially plane electrodes parallel to each other, a membrane and a substantially annular part forming a spacer between the two substantially plane electrodes in a stacking direction (XX), the two substantially plane electrodes and the spacer together delimiting an internal space of the cell,
   wherein the spacer directly contacts the two substantially plane electrodes;
   the spacer comprising:
   a peripheral part having two parallel principal faces oppose each other and a first face and a second face of the two principal faces respectively bearing against a first electrode and a second electrode of the two substantially plane electrodes, a distance separating the two principal faces defining a first thickness of the peripheral part corresponding to a third thickness of the internal space of the cell in the stacking direction (XX); and an internal part having a second thickness strictly less than the first thickness of the peripheral part, the peripheral part and the internal part being in one piece and connected to each other forming an internal annular shoulder so that the internal part has a substantially annular intermediate face facing; and at a distance from one of the electrodes of the two substantially plane electrodes, the substantially annular intermediate face supports the membrane so that the membrane divides the internal space of the cell into two compartments.

8. The electrolysis cell according to claim 7, wherein the substantially annular intermediate face extends in a plane parallel to the two principal faces of the peripheral part and is situated between the two principal faces, and wherein the internal part further comprises a substantially plane annular bearing face coplanar with one face of the two principal faces of the peripheral part.

9. The electrolysis cell according to claim 7, wherein the spacer further comprises a metal core and an electrically insulative envelope covering the metal core at least over the areas of the spacer in contact with an internal space of the electrolyzer cell in an assembled state.

10. The electrolysis cell according to claim 9, wherein the spacer further comprises at least one groove formed in the metal core, extending substantially along a circumference of the spacer, and in at least one of the two principal faces and the substantially annular intermediate face, the at least one groove forming a housing for a sealing line in the assembled state of the spacer.

11. The electrolysis cell according to claim 9, wherein the electrically insulative envelope includes at least one rib, extending substantially along a circumference of the spacer, and, in a rest state of the spacer, protruding from at least one of the two principal faces and the substantially annular intermediate face, the at least one rib forms a sealing line in the assembled state of the spacer.

* * * * *